US010359831B2

(12) United States Patent
Crawford et al.

(10) Patent No.: US 10,359,831 B2
(45) Date of Patent: Jul. 23, 2019

(54) CACHE POWER MANAGEMENT (71) Applicant: ARM Limited, Cambridge (GB)

(72) Inventors: Ashley John Crawford, Cambridge (GB); Andrew Christopher Rose, Cambridge (GB); Tessil Thomas, Cambridge (GB); David Guillen Fandos, Cambridge (GB)

(73) Assignee: ARM Limited, Cambridge (GB)

( * ) Notice: Subject to any disclaimer, the term of this patent is extended or adjusted under 35 U.S.C. 154(b) by 197 days.

(21) Appl. No.: 15/447,866

(22) Filed: Mar. 2, 2017

(65) Prior Publication Data
US 2017/0255248 A1  Sep. 7, 2017

(30) Foreign Application Priority Data

Mar. 4, 2016 (GB) .................................. 1603741.8

(51) Int. Cl.
*G06F 1/3225* (2019.01)
*G06F 1/3234* (2019.01)
(Continued)

(52) U.S. Cl.
CPC .......... *G06F 1/3275* (2013.01); *G06F 1/3225* (2013.01); *G06F 1/3287* (2013.01);
(Continued)

(58) Field of Classification Search
CPC ........... G06F 2212/1028; G06F 1/3275; G06F 2212/601; G06F 1/3225; G06F 1/3287;
(Continued)

(56) References Cited

U.S. PATENT DOCUMENTS 6,981,112 B2 * 12/2005 Christofferson .... G06F 12/0888
711/118
2012/0173907 A1 * 7/2012 Moses ................... G06F 1/3225
713/321
(Continued)

FOREIGN PATENT DOCUMENTS

GB          2 304 215      3/1997
JP          2009-282880    12/2009

OTHER PUBLICATIONS

Search Report for GB1603741.8, dated Aug. 1, 2016, 4 pages.

*Primary Examiner* — Jaweed A Abbaszadeh
*Assistant Examiner* — Brian J Corcoran
(74) *Attorney, Agent, or Firm* — Nixon & Vanderhye P.C.

(57) ABSTRACT

A method of operating a cache and corresponding apparatus are provided. The cache is capable of being only partially powered, and a decision to reduce the proportion of the cache which is currently powered is made based on calculating a memory bandwidth equivalent of expending the current active cache leakage power on memory access. The cache hit bandwidth is compared against this memory bandwidth equivalent and when the cache hit bandwidth is less than the memory bandwidth equivalent, the proportion of the cache which is currently powered is reduced. A analogous decision may also be made and based on calculating a cache hit bandwidth equivalent for an increment increase in cache leakage power, and when the cache miss bandwidth exceeds the cache hit bandwidth equivalent, the proportion of the cache which is currently powered is increased.

19 Claims, 3 Drawing Sheets

(51) Int. Cl.
*G06F 1/3287* (2019.01)
*G06F 1/3296* (2019.01)

(52) U.S. Cl.
CPC ............ *G06F 1/3296* (2013.01); *Y02D 10/13* (2018.01); *Y02D 10/14* (2018.01)

(58) Field of Classification Search
CPC . G06F 12/0811; G06F 12/0897; Y02D 10/13; Y02D 10/14; Y02D 10/17
See application file for complete search history.

(56) References Cited

U.S. PATENT DOCUMENTS

| | | | | |
|---|---|---|---|---|
| 2014/0082249 | A1* | 3/2014 | Pan | G06F 11/3485 710/308 |
| 2014/0325248 | A1* | 10/2014 | Kim | G06F 1/3234 713/320 |
| 2015/0378424 | A1* | 12/2015 | Anyuru | G06F 1/3234 713/320 |
| 2016/0048447 | A1* | 2/2016 | Solihin | G06F 12/0238 711/104 |

* cited by examiner

CACHE POWER MANAGEMENT

This application claims priority to GB Patent Application No. 1603741.8 filed 4 Mar. 2016, the entire content of which is hereby incorporated by reference.

TECHNICAL FIELD

The present disclosure relates to the field of data processing. More particularly it relates to the operation of a cache memory in a data processing apparatus.

BACKGROUND

The use of a cache to store temporary copies of data items retrieved from memory allows the latency associated with retrieving data items from memory to be reduced and furthermore to reduce the energy expenditure associated with retrieval of those data items. However, a cache itself has a leakage power cost to the system in which it is implemented and in a large cache this power expenditure can be considerable. Steps may be taken to reduce the leakage of a cache, when that cache is provided in a number of portions (e.g. banks), for example by powering down one or more portions of the cache when it is determined that a smaller cache will adequately meet the processing requirements of the system. Hence the benefit of the reduced leakage power resulting from powering down a portion of the cache can be gained. Nevertheless determining when it is appropriate to power down a portion of the cache is not easy and the opportunity remains to improve such cache power management decision making processes.

SUMMARY

In at least some embodiments a method of operating a cache comprising the steps of: calculating a cache hit bandwidth from monitoring performance of the cache; calculating an active cache leakage power in dependence on a proportion of the cache which is currently powered; calculating a memory bandwidth equivalent for expending the active cache leakage power on memory access; and when the cache hit bandwidth is less than the memory bandwidth equivalent, reducing the proportion of the cache which is currently powered.

In at least some embodiments an apparatus for operating a cache is provided comprising: cache monitoring circuitry to monitor performance of the cache; cache performance calculation circuitry to receive performance data from the cache monitoring circuitry and to: calculate a cache hit bandwidth from the performance data, calculate an active cache leakage power in dependence on a proportion of the cache which is currently powered, and calculate a memory bandwidth equivalent for expending the active cache leakage power on memory access; and cache power control circuitry to reduce the proportion of the cache which is currently powered when the cache hit bandwidth is less than the memory bandwidth equivalent.

In at least some embodiments an apparatus for operating a cache is provided comprising: means for calculating a cache hit bandwidth from monitoring performance of the cache; means for calculating an active cache leakage power in dependence on a proportion of the cache which is currently powered; means for calculating a memory bandwidth equivalent for expending the active cache leakage power on memory access; and means for reducing the proportion of the cache which is currently powered when the cache hit bandwidth is less than the memory bandwidth equivalent.

BRIEF DESCRIPTION OF THE DRAWINGS

The present techniques will be described further, by way of example only, with reference to embodiments thereof as illustrated in the accompanying drawings, in which.

DESCRIPTION OF EMBODIMENTS

At least some embodiments provide a method of operating a cache comprising the steps of: calculating a cache hit bandwidth from monitoring performance of the cache; calculating an active cache leakage power in dependence on a proportion of the cache which is currently powered; calculating a memory bandwidth equivalent for expending the active cache leakage power on memory access; and when the cache hit bandwidth is less than the memory bandwidth equivalent, reducing the proportion of the cache which is currently powered.

Accordingly, the present techniques provide an objective utility metric according to which a decision can be made as to whether to power down part of the cache. In particular, the trade-off considered here is that of the cache hit bandwidth provided by a given proportion of the cache which is active against the leakage power of that proportion of the cache. In other words, to justify this proportion of the cache being powered, the cache's hit bandwidth must outweigh its leakage. In order to make this assessment it is recognised here that the equivalent memory cost, i.e. the power required to return the same bandwidth from memory (meaning here going beyond the cache to access the required data items, e.g. to external memory such as DRAM), should be evaluated and then compared against the leakage power attributed to the proportion of the cache which is currently active. Specifically where the cache hit bandwidth falls to less than the memory bandwidth equivalent, the present techniques teaches concluding that powering this proportion of the cache is not justified and a portion of the cache should be powered down.

The cache may be provided in a variety of forms and in particular sub-division of the cache may be implemented in a variety of fashions. The characteristic of relevance to the present techniques is that a portion of the cache may be individually powered down whilst leaving the remainder of the cache powered. In some embodiments the cache comprises multiple banks, wherein at least one bank of the multiple banks is capable of being powered off independently of a remainder of the multiple banks. It may be the case that each bank is configured in the same way and thus in some embodiments each bank of the multiple banks is capable of being individually powered off. Further, power control for the multiple banks of the cache may be provided in a variety of ways, but in some embodiments reducing the proportion of the cache which is currently powered comprises powering off at least one bank of the multiple banks.

In a similar manner, the proportion of the cache which is currently powered may be given by a number of the multiple banks which are currently powered.

The active cache leakage power calculated on the basis of the proportion of the cache which is currently powered may for example be a per-bank leakage power multiplied by the number of banks which are currently powered. However, in some embodiments the active cache leakage power is calculated in dependence on a power-down threshold factor, wherein the power-down threshold factor reduces a value of the proportion of the cache which is currently powered when the value is used in calculating the active cache leakage power. In other words, a "scaled" active leakage power is used, by means of the power-down threshold factor which is introduced into the calculation of the active cache leakage power to modify the proportion of the cache which is (supposedly) currently powered used in the calculation. Specifically, it artificially reduces the proportion of the cache which is currently powered when the active cache leakage power is calculated. In turn this reduces the calculated memory bandwidth equivalent. As such, this settable value is implemented as a power-down threshold factor, the setting of which enables the system designer (or operator) to influence the point at which the conclusion is drawn that the proportion of the cache which is currently powered should be reduced. Influence over this threshold thus provides control over the point at which a portion of the cache is powered down and in particular to set how easily this power-down decision is triggered.

The power-down threshold factor may be defined and used in a variety of ways, but in some embodiments the power-down threshold factor can be set in a range such that the value of the proportion of the cache which is currently powered used in calculating the active cache leakage power ranges between: the proportion of the cache which is currently powered for a first power-down threshold factor value; and the proportion of the cache which is currently powered less an increment proportion of the cache which is capable of being powered down for a second power-down threshold factor value. Thus the power-down threshold factor can be set so that the active cache leakage power used in the calculation corresponds to all of the proportion of the cache which is currently powered, i.e. the actual proportion of the cache which is powered, through to a proportion of the cache which would be powered if an increment proportion of the cache was powered off (e.g. where this increment is a bank, where one bank is switched off). In turn this causes the memory bandwidth equivalent to be calculated corresponding to all of the currently powered proportion of the cache, through to a memory bandwidth equivalent corresponding to if that increment proportion were switched off. The effect of this choice of value is to set how aggressively the decision making with regard to powering down the increment proportion of the cache is made, ranging from using the first power down threshold factor value which will more readily power down this increment proportion (essentially as soon as the hit bandwidth benefit of powering this increment proportion is less than optimal), through to the second power-down threshold factor value, which will result in this increment proportion of the cache only being powered down when there is essentially perceived to be no hit bandwidth benefit at all to be gained from it being powered.

In some embodiments the power-down threshold factor is set to a value nearer to the second power-down threshold factor value than the first power-down threshold factor value. This choice of the power-down threshold factor enables performance to be prioritised over power saving (by a settable degree), although a range of other choices, depending on the relative importance of these factors, is also contemplated.

With less than all of the cache powered, the present techniques recognise that an analogous decision can be made as to when it is appropriate to power up a portion of the cache. This could for example become appropriate due to a change in the program being executed (and thus its memory access pattern) or indeed if a miss-decision in downsizing was made. However the present techniques additionally recognise that changes in the hit bandwidth after resizing do not provide suitable criteria on which to base an upsizing decision, since the hit bandwidth could reduce due to either or both of the above-mentioned factors (change in program and downsizing miss-decision). Instead, the present techniques advocate the use of cache miss bandwidth as an indicator for potential upsizing benefit. The cache miss bandwidth is recognised to be an "indicative" metric, because the conversion of misses to hits on upsizing is unknown. The method may prioritise upsizing over downsizing to minimize performance loss and according to this pro-performance bias, a best case of 100% conversion of misses to hits may be assumed. Thus in some embodiments the method comprises the further steps, taken when the proportion of the cache which is currently powered is less than all of the cache, of: calculating a cache miss bandwidth from monitoring performance of the cache; calculating an increment cache leakage power in dependence on an increment proportion of the cache which is currently not powered; calculating a cache hit bandwidth equivalent for incurring the increment cache leakage power; and when the cache miss bandwidth exceeds the cache hit bandwidth equivalent, increasing the proportion of the cache which is currently powered by the increment proportion.

In some embodiments the increment proportion of the cache is a bank of the multiple banks.

Analogously to the above-mentioned power-down threshold factor, in some embodiments the increment cache leakage power is calculated in dependence on a power-up threshold factor, wherein the power-up threshold factor reduces a value of the increment proportion of the cache which is currently not powered when the value is used in calculating the increment cache leakage power. In other words, a "scaled" increment cache leakage power is used, by means of the power-up threshold factor which is introduced into the calculation of the increment cache leakage power. Specifically, it artificially reduces the increment cache leakage power. In turn this reduces the cache hit bandwidth equivalent. As such, this settable value is implemented as a power-up threshold factor, the setting of which enables the system designer (or operator) to influence the point at which the conclusion is drawn that the proportion of the cache which is currently powered should be increased. Influence over this threshold thus provides control over the point at which a portion of the cache is powered up and in particular to set how easily this power-up decision is triggered.

The power-up threshold factor may be defined and used in a variety of ways, but in some embodiments the power-up threshold factor can be set in a range such that the value of the increment proportion of the cache which is currently not powered used in calculating the increment cache leakage power ranges between: the increment proportion of the cache which is currently not powered for a first power-up threshold factor value; and zero for a second power-up threshold factor value. Thus the power-up threshold factor can be set so that the increment cache leakage power used in the calculation corresponds to all of the increment proportion of the cache, i.e. the candidate portion for powering up, through to zero, i.e. having no effect on the increment proportion of the cache used in the calculation. In turn this causes the cache miss bandwidth equivalent to be calculated corresponding to all of the increment proportion of the cache, through to a cache miss bandwidth equivalent of zero. The effect of this choice of value is to set how aggressively the decision making with regard to powering up the increment proportion of the cache is made, ranging from using the first power down threshold factor value which will more readily power up this increment proportion (essentially as soon as there is any expected cache hit bandwidth benefit of powering up this increment proportion), through a value very close to the second power-down threshold factor value (i.e. just above zero), which will result in this increment proportion of the cache only being powered up when a "whole bank's worth" of cache hit bandwidth is expected to be gained from it being powered. It should be noted that setting the power-down threshold factor value at the first power-up threshold factor value itself will result in the cache miss bandwidth always exceeding the cache hit bandwidth equivalent, and therefore this specific case is to be avoided (unless this "always trigger" configuration is explicitly required, e.g. for testing purposes).

In some embodiments the power-up threshold factor is set to a value nearer to the first power-up threshold factor value than the second power-up threshold factor value. This choice of the power-up threshold factor enables performance to be prioritised over power saving (by a settable degree), although a range of other choices, depending on the relative importance of these factors, is also contemplated.

In addition to the above-described determination of when to reduce the proportion of the cache which is currently powered and when to increase the proportion of the cache which is currently powered, the present techniques further recognise that following a reduction of the proportion of the cache which is currently powered the cache miss rate may often increase, or at least "spike", before settling down. Nevertheless, in order to identify situations in which the cache miss rate increases, and persists, but remains low enough not to trigger the cache miss bandwidth check, a further check is introduced to monitor the cache miss rate following a reduction in the proportion of the cache which is currently powered. This check may be defined in a variety of ways, for example as a check whether the cache miss rate increases by more than a pre-set proportion (a relative threshold) of the cache miss rate prevalent before the downsizing of the cache. Alternatively an absolute miss rate threshold, as appropriate, may be defined. In either case the check may further comprise identifying whether the cache miss rate after reducing the proportion of the cache which is powered exceeds the defined threshold for more than a predetermined period. Thus, in some embodiments, the method comprises the further steps, after reducing the proportion of the cache which is currently powered, of: monitoring a cache miss rate; and when the cache miss rate exceeds a predetermined cache miss rate threshold for a predetermined period, increasing the proportion of the cache which is currently powered.

Moreover, the present techniques recognise that where the above-described cache power management techniques are applied to control when to power down and power up parts of the cache, a more stable power management protocol is provided by preventing the cache power management from again reducing the proportion of the cache which is currently powered subsequent to an increase in the proportion of the cache which is currently powered. Thus, thrashing is avoided. Thus, in some embodiments the method comprises at least one of the further steps of: delaying a calculation of whether the memory bandwidth equivalent exceeds the cache hit bandwidth; and delaying any subsequent reduction in the proportion of the cache which is currently powered.

The performance of the cache, in particular in terms of its hit and miss rates, may be monitored in a variety of ways. Note that monitoring the performance of the cache may be performed by means of (only) any two of: a hit counter, a miss counter, and an access counter (since the access count equals the hit count plus the miss count). The monitoring may be performed at a "global" level for the entire cache, or may be performed on a per-bank basis. Accordingly, in some embodiments monitoring performance of the cache comprises monitoring a global cache performance, whilst in other embodiments monitoring performance of the cache comprises monitoring per-bank cache performances.

The present techniques may be implemented by software (perhaps embodied as firmware) or hardware, and some embodiments provide a computing device readable storage medium in which instructions are stored in a non-transient fashion which when executed by the computing device cause the computing device to carry out the method of any preceding claim.

Some embodiments provide software which when executed by a computing device causes the computing device to carry out any particular embodiment of the methods described above.

Some embodiments provide an apparatus for operating a cache comprising: cache monitoring circuitry to monitor performance of the cache; cache performance calculation circuitry to receive performance data from the cache monitoring circuitry and to: calculate a cache hit bandwidth from the performance data, calculate an active cache leakage power in dependence on a proportion of the cache which is currently powered, and calculate a memory bandwidth equivalent for expending the active cache leakage power on memory access; and cache power control circuitry to reduce the proportion of the cache which is currently powered when the cache hit bandwidth is less than the memory bandwidth equivalent.

Some embodiments provide an apparatus for operating a cache comprising: means for calculating a cache hit bandwidth from monitoring performance of the cache; means for calculating an active cache leakage power in dependence on a proportion of the cache which is currently powered; means for calculating a memory bandwidth equivalent for expending the active cache leakage power on memory access; and means for reducing the proportion of the cache which is currently powered when the cache hit bandwidth is less than the memory bandwidth equivalent.

Some particular embodiments will now be described with reference to the figures.

Figure 1:
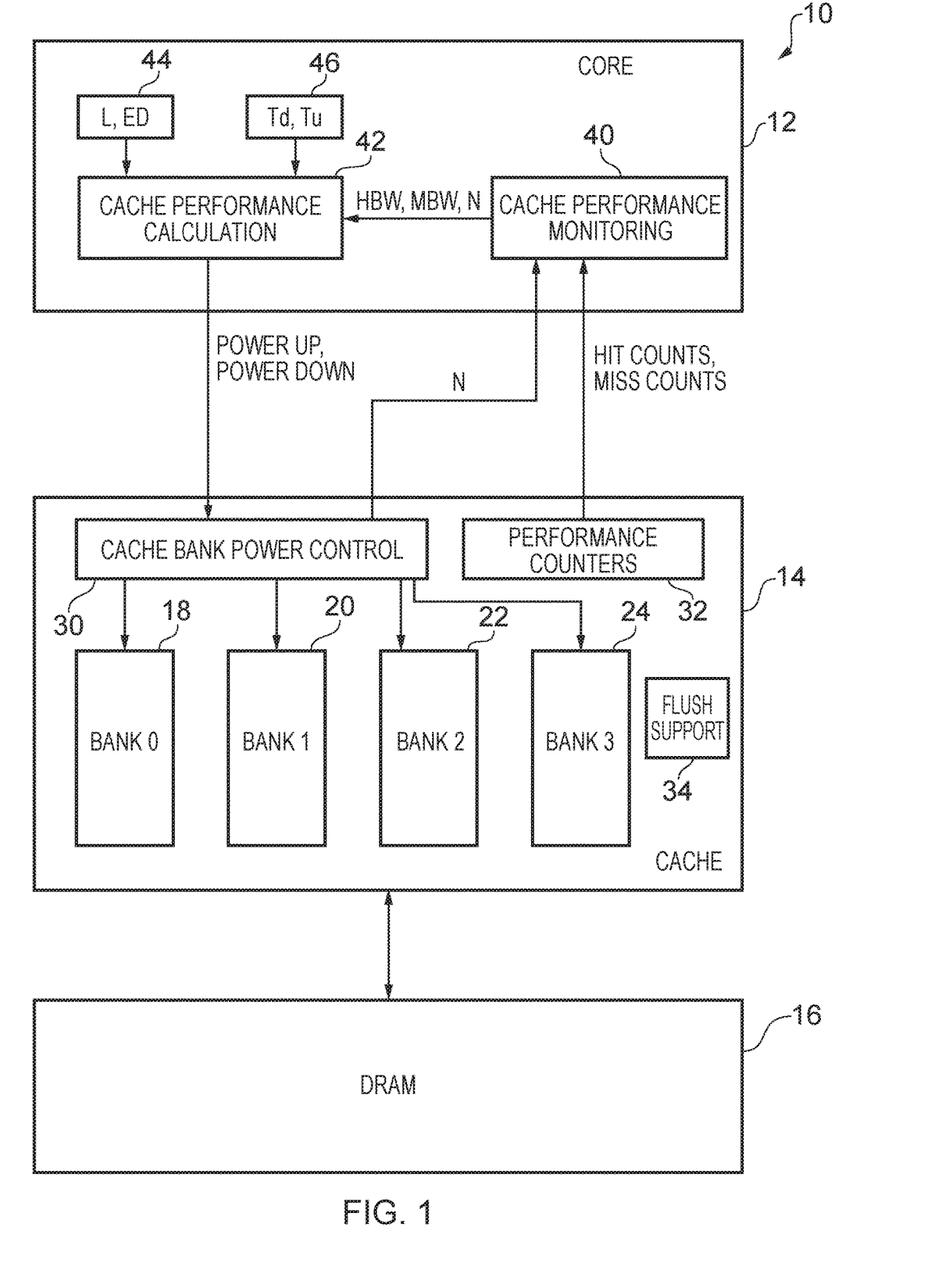
FIG. 1 schematically illustrates a data processing system comprising a cache in one embodiment.

FIG. 1 schematically illustrates a data processing system 10, comprising a processor core 12, a cache 14 and a memory (DRAM) 16. As will be familiar to one of ordinary skill in the art, the processor core 12 performs data processing operations on data items which are retrieved from the memory 16, and in order to avoid the latency and energy expenditure associated with always reading these data items from and writing these data items to the memory 16, the cache 14 is provided in order to hold temporary copies of these data items. The cache 14 itself is subdivided into a number (here four) of banks 18-24. A particular feature of note in the present context is the cache bank power control circuitry 30 which forms part of the cache 14. This enables each of the banks to be individually powered up or powered down. Flush support circuitry 34 enables the entries in a given bank to be flushed, when that bank is to be powered down, without causing hazards or blocking continued execution. The cache 14 further comprises a number of performance counters 32, which in the illustrated embodiment in FIG. 1 comprise a global hit counter and a global miss counter. Note that other embodiments may equivalently provide an access counter (counting all accesses to the cache) and only one of the hit counter and miss counter, since the number of accesses equals the number of hits plus the number of misses. Further, whilst in the illustrated embodiment the performance counters 32 are configured to globally monitor the performance of the cache across all of its four banks, in other embodiments individual performance counters for each bank are provided.

In the present context, two particular functions supported by the core 12 are of particular interest here and these are illustrated by the cache performance monitoring 40 and the cache performance calculation 42. It should be noted that these functions, in the embodiment illustrated in FIG. 1, are the result of software retrieved from the memory 16 and executing in the core 12, but in other embodiments may be provided by firmware or hardware, in which case cache performance monitoring circuitry and cache performance calculation circuitry configured to support these functions forms part of the core 12 (or another part of the system 10). See further commentary below with regard to a hardware implementation. During operation of the data processing system (i.e. data processing operations involving the core accessing data items in the cache 14 and memory 16) the cache performance monitoring unit 40 receives indications of hit counts and miss counts from the performance counters 32 and on this basis determines a cache hit bandwidth and a cache miss bandwidth. FIG. 1 also illustrates the value N (the number of active cache banks) being received by the cache performance monitoring unit 40 and this being passed onto the cache performance calculation unit 42. In other embodiments the value N may be directly received from the cache bank power control 30 by the cache performance calculation unit 42. N indicates the number of banks in the cache 14 which are currently powered. The cache performance calculation unit 42 also has access to storage 44 and 46 from which the values L, ED, Td, and Tu are retrieved. L is the leakage power of one bank, e.g. in mW. ED is the energy expenditure for accessing data the DRAM 16, e.g. in mJ/MB, where this includes the energy expended in the use of, say, a memory controller (not illustrated), DDR PHY (not illustrated) and the DRAM itself. Td is a downsizing threshold parameter and Tu is an upsizing threshold parameter.

The cache performance calculation unit 42 performs two particular calculations, firstly calculating an active cache leakage power based on the number of banks which are currently powered, and secondly calculating a memory bandwidth equivalent for expending the active cache leakage power on memory access. These calculations are based on the premise that the break-even point in determining whether the number of active cache banks N is justified is: $L*N=ED*HBW$ (where HBW is the cache hit bandwidth, e.g. in MB/s). In these terms, continued operation of the cache (with N banks active) is then justified when $HBW>N*L/ED$. So when $HBW<N*L/ED$ the determination may be made that it is appropriate to "downsize" the cache to $N-1$ banks. However, the downsizing threshold value Td (which is defined to take a value between 0 and 1) is also used here and applied such that the determination is made of whether $HBW<(N-Td)*L/ED$, and where this is true the cache performance calculation unit 42 signals a power down signal to the cache bank power control 30, and one of the banks is then powered down.

It is noted here that this determination does not take into account the cost of flushing the cache, but this is assumed to be absorbed over time, in the benefit of downsizing, since programs are typically stable over relatively long periods. Moreover, there is a benefit in tag dynamic power saving, from the powered-off banks, which this equality does not rely on.

Conversely, once the cache has been reduced in size (at least one bank powered down), there will typically come a point where it will be required to increase the size of the cache again, either because the software being executed by the core has changed leading to a change in (potential) cache usage, or because a miss-decision in downsizing was made. The technique adopted here for deciding when to upsize the cache (power-up banks) is to make use of the cache miss bandwidth (MBW) as an indicator for the potential upsizing benefit. It should be noted that the miss bandwidth can at best be an indicative metric because a conversion of misses to hits on upsizing is unknown. However, additionally the upsizing decision is prioritised over the downsizing decision to minimise performance loss. For the purpose of determining when to upsize, the cache performance monitoring unit 40 determines the cache miss bandwidth (MBW) and the cache performance calculation unit 42 determines an increment cache leakage power if a further bank were to be powered up. A cache hit bandwidth equivalent is calculated by the cache performance calculation unit 42 for this increment cache leakage power and this is compared to the cache miss bandwidth. Thus, where the miss bandwidth (MBW) exceeds this cache hit bandwidth equivalent, the determination may be made that is appropriate to "upsize" the cache to $N+1$ banks. However, analogously to the downsizing described above, an upsizing threshold value Td (which is defined to take a value between 0 and 1) is used and applied such that the determination made is of whether $MBW>(1-Tu)*L/D$, and where this is true the cache performance calculation unit 42 signals a power-up signal to the cache bank power control 30, and one of the banks is then powered up.

As will be described in more detail below with reference to FIG. 4 the cache performance calculation 42 also plays a regulation role with respect to the cache bank power control, such that after a downsizing of the cache (at least one bank powered off) it is checked whether the miss rate then increased even though this may be below the above-described miss bandwidth check, for example by determining if a relative increase in the cache miss rate has occurred (e.g. greater than 10% of the pre-downsize value, or if an absolute increase in the cache miss rate has occurred, for example exceeding a defined threshold for longer than a pre-set period). In these cases a bank can then be powered back up and further downsizing of the cache is prevented for a pre-set period to prevent thrashing.

As mentioned above, this control could be implemented in hardware, and in such a case an example of a basic algorithm outline for a hardware control loop (omitting the regulation mechanisms) is:

```
@tick: // timed period, e.g. 10-100ms
  // Upsizing (prioritised)
  If (N < TotalCacheBanks && MBW > (1-Tu) * L/ED) {
    Upsize: N++
  // Downsizing
```

```
} else if (N > 1 && HBW < (N-Td) * L/ED) {
    Downsize: N--
}
```

Figure 2:
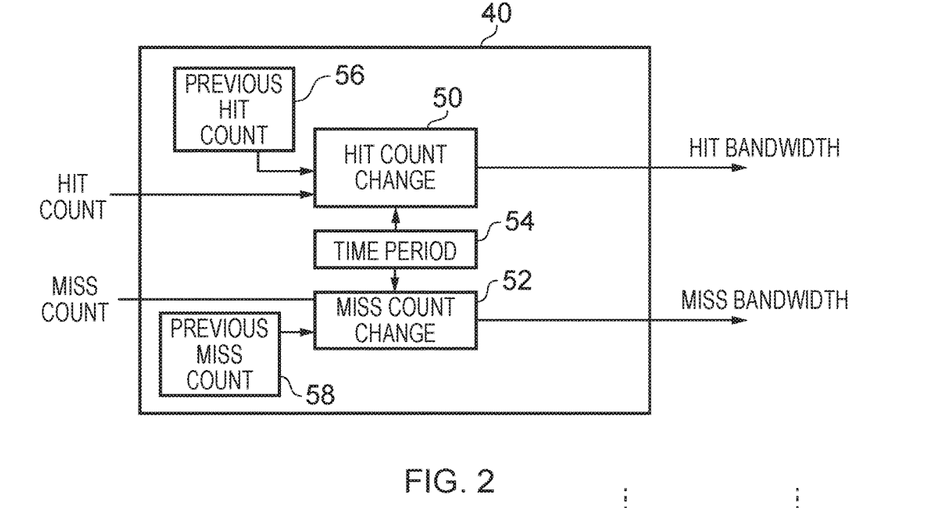
FIG. 2 schematically illustrates in more detail the cache performance monitoring block of FIG. 1 in one embodiment.

FIG. 2 schematically illustrates in more detail an example configuration of the cache performance monitoring unit 40 of FIG. 1, and the conversion of a hit count and miss count into a hit bandwidth and a miss bandwidth respectively can be seen. A previous hit count 56 is compared to the current hit count and the difference, over the time period 54 between the two, gives the hit bandwidth. Similarly, a determination of the miss count change 52 between a previous miss count 58 and the current miss count over the time period 54 gives the miss bandwidth.

Figure 3A:
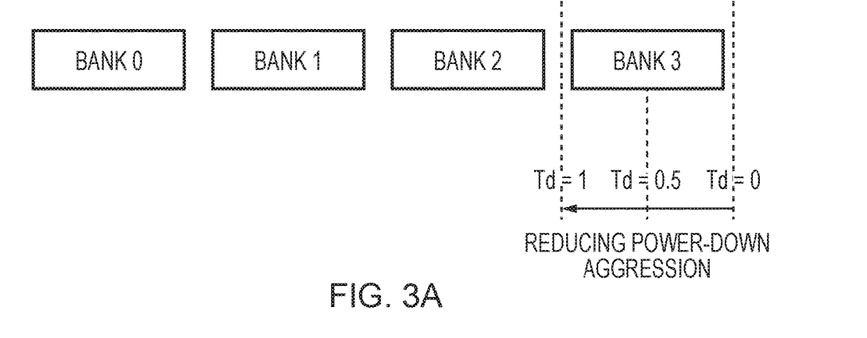
FIGS. 3A and 3B schematically illustrate the choice of power-down and power-up thresholds in one embodiment.
Figure 3B:
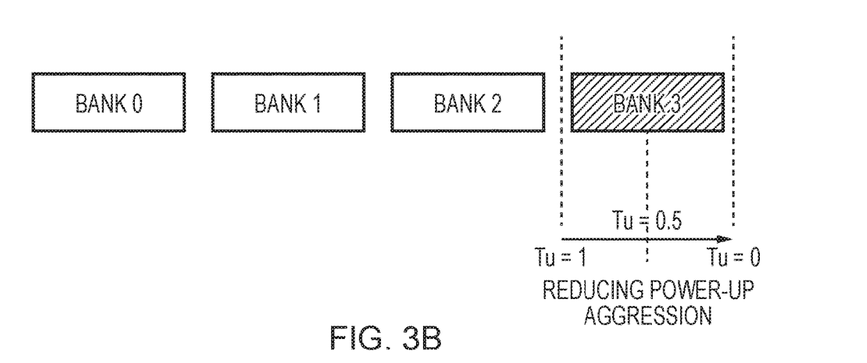

FIGS. 3A and 3B schematically illustrate the influence of the setting of the power-down threshold value Td and the power-up threshold value Tu. From the above-described definition of the condition (HBW<(N−Td)*L/ED) it can be seen that the effect of the power-down threshold value Td is to artificially reduce the value N by up to one unit, i.e. one bank. This is visually shown in FIG. 3A, where the arrow also shows the direction of reducing power-down aggression, i.e. the threshold for deciding to power down bank 3 in FIG. 3A will be most easily crossed when Td=0, whilst setting Td=1 means that a decision to downsize (and power down bank 3) will be least easily reached. Conversely, FIG. 3B illustrates the opposite situation in which a determination is being made as to whether to power-up bank 3 (which is currently powered off). The choice of value for the power-up threshold Tu determines how aggressively this decision is made, with a setting of (close to) Tu=1 most easily allowing the triggering of the decision to power up bank 3, whilst the least aggressive setting is made with Tu=0. Note the comments above about avoiding setting Tu=1 in most normal usage configurations. Tests carried out in implementing the present techniques have shown that it can be beneficial to set both Td and Tu to be more than 0.5 to bias the power configuration of the cache towards upsizing. Performance is therefore prioritised over power consumption. However, other configurations are conceivable and for example in a configuration in which power saving should be prioritised over all other considerations, setting Tu and Td to be less than 0.5 may be implemented. Asymmetric setting of Tu and Td, depending on the system requirements is also contemplated.

Figure 4:
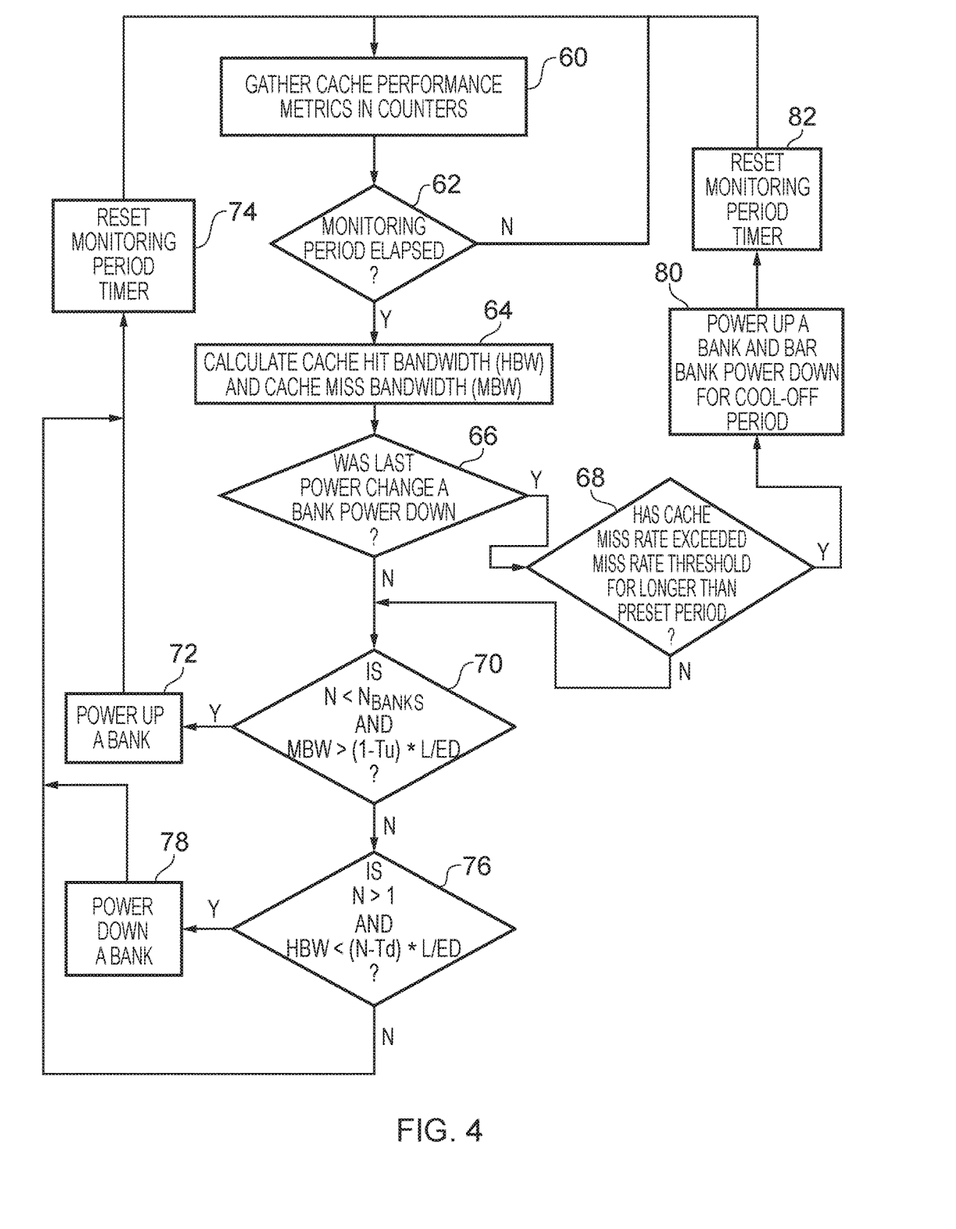
FIG. 4 schematically illustrates a sequence of steps which are taken when carrying out the method of one embodiment.

FIG. 4 schematically illustrates a sequence of steps which are taken according to the method of one embodiment. The flow can be considered to begin at step 60 where metrics indicative of the cache performance are gathered in the counters, in the example of FIG. 1 these being a hit counter and a miss counter. Then at step 62 it is determined if the monitoring period has elapsed, and whilst it has not the flow returns to step 60. Once the monitoring period elapses, then at step 64 the cache hit bandwidth (HBW) and the cache miss bandwidth (MBW) are calculated. At step 66 it is determined if the last power change was a bank power down. If this is the case then the flow proceeds to step 68, where it is checked if an increase in the cache miss rate has occurred as a result. In the example embodiment of FIG. 4 this is checked by determining if the cache miss rate has exceeded a miss rate threshold for longer than the preset period, where it should be understood that this threshold could be defined either in relative or absolute terms. If such an increase has not occurred then the flow proceeds to step 70, where it is determined if less than all the banks of the cache are currently powered (N<$N_{banks}$), and if the cache miss bandwidth (MBW) exceeds the calculated cache hit bandwidth equivalent, i.e. (1−Tu)*L/ED. If this is the case then at step 72 a bank is powered up and then at step 74 the monitoring period timer is reset. The flow then returns to step 60. A negative outcome of the decision step 70 takes the flow to step 76, where a determination is made if at least one bank of the cache is currently powered (N>1) and if the cache hit bandwidth (HBW) is less than the memory bandwidth equivalent, i.e. (N−Td)*L/ED. If this is true then at step 78 a bank is powered down and the flow proceeds to step 74. Otherwise, a negative outcome of the decision at step 76 leads the flow directly to step 74. Finally, returning to a consideration of step 68, if a determination if made here that the cache miss rate has indeed increased in an undesirable manner since a bank power down, then the flow proceeds to step 80, where a bank is powered up and subsequent bank power down is barred for a cool off period. Thereafter, the monitoring period time is reset a step 82 and the flow returns to step 60.

In brief overall summary, a method of operating a cache and corresponding apparatus are provided. The cache is capable of being only partially powered, and a decision to reduce the proportion of the cache which is currently powered is made based on calculating a memory bandwidth equivalent of expending the current active cache leakage power on memory access. The cache hit bandwidth is compared against this memory bandwidth equivalent and when the cache hit bandwidth is less than the memory bandwidth equivalent, the proportion of the cache which is currently powered is reduced. A analogous decision may also be made and based on calculating a cache hit bandwidth equivalent for an increment increase in cache leakage power, and when the cache miss bandwidth exceeds the cache hit bandwidth equivalent, the proportion of the cache which is currently powered is increased.

In the present application, the words "configured to . . . " or "arranged to" are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" or "arranged to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. A method of operating a cache comprising the steps of:
   calculating a cache hit bandwidth from monitoring performance of the cache;
   calculating an active cache leakage power in dependence on a proportion of the cache which is currently powered;
   calculating a memory bandwidth equivalent for expending the active cache leakage power on memory access; and when the cache hit bandwidth is less than the memory bandwidth equivalent, reducing the proportion of the cache which is currently powered.

2. The method as claimed in claim 1, wherein the cache comprises multiple banks, wherein at least one bank of the multiple banks is capable of being powered off independently of a remainder of the multiple banks.

3. The method as claimed in claim 2, wherein each bank of the multiple banks is capable of being individually powered off.

4. The method as claimed in claim 2, wherein reducing the proportion of the cache which is currently powered comprises powering off at least one bank of the multiple banks.

5. The method as claimed in claim 2, wherein the proportion of the cache which is currently powered is given by a number of the multiple banks which are currently powered.

6. The method as claimed in claim 1, wherein the active cache leakage power is calculated in dependence on a power-down threshold factor, wherein the power-down threshold factor reduces a value of the proportion of the cache which is currently powered when the value is used in calculating the active cache leakage power.

7. The method as claimed in claim 6, wherein the power-down threshold factor can be set in a range such that the value of the proportion of the cache which is currently powered used in calculating the active cache leakage power ranges between:
the proportion of the cache which is currently powered for a first power-down threshold factor value; and
the proportion of the cache which is currently powered less an increment proportion of the cache which is capable of being powered down for a second power-down threshold factor value.

8. The method as claimed in claim 7, wherein the power-down threshold factor is set to a value nearer to the second power-down threshold factor value than the first power-down threshold factor value.

9. The method as claimed in claim 1, comprising the further steps, taken when the proportion of the cache which is currently powered is less than all of the cache, of:
calculating a cache miss bandwidth from monitoring performance of the cache;
calculating an increment cache leakage power in dependence on an increment proportion of the cache which is currently not powered;
calculating a cache hit bandwidth equivalent for incurring the increment cache leakage power; and
when the cache miss bandwidth exceeds the cache hit bandwidth equivalent, increasing the proportion of the cache which is currently powered by the increment proportion.

10. The method as claimed in claim 9, wherein the cache comprises multiple banks, wherein at least one bank of the multiple banks is capable of being powered off independently of a remainder of the multiple banks, wherein the increment proportion of the cache is a bank of the multiple banks.

11. The method as claimed in claim 9, wherein the increment cache leakage power is calculated in dependence on a power-up threshold factor, wherein the power-up threshold factor reduces a value of the increment proportion of the cache which is currently not powered when the value is used in calculating the increment cache leakage power.

12. The method as claimed in claim 11, wherein the power-up threshold factor can be set in a range such that the value of the increment proportion of the cache which is currently not powered used in calculating the increment cache leakage power ranges between:
the increment proportion of the cache which is currently not powered for a first power-up threshold factor value; and
zero for a second power-up threshold factor value.

13. The method as claimed in claim 12, wherein the power-up threshold factor is set to a value nearer to the first power-up threshold factor value than the second power-up threshold factor value.

14. The method as claimed in claim 1, comprising the further steps, after reducing the proportion of the cache which is currently powered, of:
monitoring a cache miss rate; and
when the cache miss rate exceeds a predetermined cache miss rate threshold for a predetermined period, increasing the proportion of the cache which is currently powered.

15. The method as claimed in claim 14, comprising at least one of the further steps of:
delaying a calculation of whether the memory bandwidth equivalent exceeds the cache hit bandwidth; and
delaying any subsequent reduction in the proportion of the cache which is currently powered.

16. The method as claimed in claim 1, wherein monitoring performance of the cache comprises monitoring a global cache performance.

17. The method as claimed in claim 2, wherein monitoring performance of the cache comprises monitoring per-bank cache performances.

18. A computing device readable storage medium in which instructions are stored in a non-transient fashion which when executed by a computing device cause the computing device to carry out the method of claim 1.

19. Apparatus for operating a cache comprising:
cache monitoring circuitry to monitor performance of the cache;
cache performance calculation circuitry to receive performance data from the cache monitoring circuitry and to:
calculate a cache hit bandwidth from the performance data,
calculate an active cache leakage power in dependence on a proportion of the cache which is currently powered, and
calculate a memory bandwidth equivalent for expending the active cache leakage power on memory access; and
cache power control circuitry to reduce the proportion of the cache which is currently powered when the cache hit bandwidth is less than the memory bandwidth equivalent.

* * * * *